May 31, 1927.
A. SAGET
1,631,066
MEANS FOR LOCKING HAND OPERATED BRAKES
Filed April 15, 1927
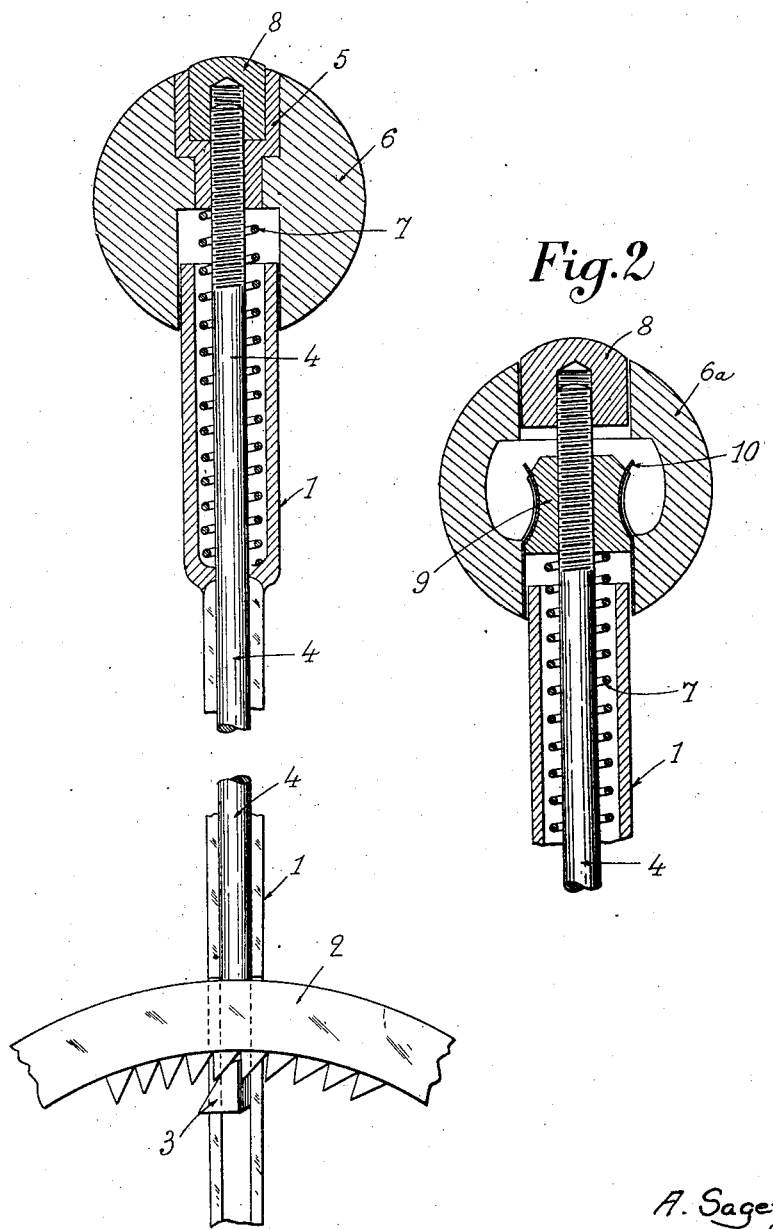

Patented May 31, 1927.

1,631,066

UNITED STATES PATENT OFFICE.

ANDRE SAGET, OF PARIS, FRANCE.

MEANS FOR LOCKING HAND-OPERATED BRAKES.

Application filed April 15, 1927, Serial No. 184,107, and in France April 14, 1926.

The hand operated brakes, such as the brakes employed upon motor vehicles, are actuated by means of a lever which is held in place by a spring controlled stud which is engaged with a stationary toothed quadrant, and the said stud may be released therefrom by acting upon a rod carrying the said stud at one end.

It may happen that by reason of the wear of the toothed quadrant or the failure of the spring, or from any other cause, the said stud will become disengaged from the quadrant, so that the lever will no longer be held and the brake will cease to be applied.

The present invention relates to a device adapted for use with the control lever of such hand brakes, whereby all improper disengagement of the stud will be obviated. The said device is chiefly characterized in that it comprises a stop which is screwed to the threaded end of the rod carrying the locking stud, and will hold the said rod in the locking position when it makes contact with the control lever.

Further characteristics will be specified in the following description with reference to the appended drawings which are given solely by way of example. In this drawing:

Fig. 1 is an axial section of a locking device according to the invention.

Fig. 2 shows a modification.

In the construction shown in Fig. 1, 1 is the control lever for a hand brake, and 2 a toothed quadrant adjacent the said lever. A stud or latch 3 cooperating with said quadrant is mounted on one end of a rod 4 which is disposed in a recess formed in the controlling lever 1, in which it is slidable. At the upper end of the said rod is a screw-threaded portion coacting with a tapped ring 5 secured to a knob 6 which, in this construction, has a spherical shape. A spring 7 bears at one end against the lever 1 and at the other end against the ring 5, and thus tends to separate the said ring from the lever whereby the rod 4 will be raised and the latch 3 maintained in engagement with the quadrant 2.

By acting upon the knob 6 in such manner as to compress the spring 7, the rod 4 will be lowered, thus disengaging the latch 3 from the quadrant 2, so that the brake lever may be operated in the usual manner.

If the knob 6 is turned so as to screw the ring 5 upon the rod 4, it will be readily observed that since the said rod can no longer be raised when the latch 3 is brought entirely into the corresponding space between the teeth of the quadrant, the knob will accordingly move upon the said rod, thus compressing the spring until it makes contact with the upper part of the lever 1. The said knob can no longer be pressed upon in order to effect the descent of the rod and the release of the latch, so that the lever will be held in place and can only be moved when the said knob is turned in the reverse direction and thus unscrewed.

A screw cap 8 is mounted on the end of the rod 4 and serves as the upper abutment for the knob 6.

In the modification shown in Fig. 2, the threaded part of the rod 4 coacts with a tapped member 9 of special shape having therein longitudinal grooves for the insertion of spring strips 10 which are secured at one end to the spherical knob $6^a$.

When the said knob is turned, the springs 10, which are held between the two sides of their respective grooves in the member 9, will impart to this member 9 the movement of rotation of the said knob, whereby the said member will be screwed or unscrewed upon the rod 4. The spring 7, which normally engages the latch 3 with the toothed quadrant 2, abuts as in the preceding case upon the lever 1 and the member 9 which it urges upwardly. When the member 9 is screwed to the maximum, it will make contact with the upper part of the lever 1, so that the rod 4 will be held in place. If a strong pressure is now exercised upon the knob $6^a$, the springs 10 will be raised out of their grooves, and thus the member 9 no longer follows the rotation of the knob; it will thus be impossible to unscrew the member 9 and hence to release the brake lever, until the springs 10 have been again brought into their grooves by strongly drawing the said knob to the top. The device will thus secure the parts in position in a most reliable manner.

Obviously, the present invention is not limited to the devices herein specified which are given solely by way of example, and they are susceptible of numerous modifications in detail without departing from the principle of the invention. In particular, it has been supposed that the locking device according to the invention is utilized for brake levers which are held in place by a stud or latch engaging the teeth of a quadrant disposed above the said latch, but it is obvious that the said device may be utilized with equal facility in the case in which the said quadrant is disposed below the said stud or latch.

Having now described my invention, what I claim as new and desire to secure by Letters Patent is:

1. In combination with a brake handlever, a locking quadrant, a latch adapted to cooperate with said quadrant, a spring controlled latch rod longitudinally movable along said brake handlever and a stop piece adapted to be screwed along the outer end of said latch rod and to abut against the outer end of said brake handlever for securing said latch in its operative position.

2. In combination with a brake handlever, a locking quadrant, a latch adapted to cooperate with said quadrant, a spring controlled latch rod longitudinally movable along said brake handlever, a stop piece adapted to be screwed along the outer end of said latch rod and to abut against the outer end of said brake handlever for securing said latch in its operative position and an actuating knob connected to said stop piece and guided upon said outer end of the brake handlever.

3. In combination with a brake handlever, a locking quadrant, a latch adapted to cooperate with said quadrant, a spring controlled latch rod longitudinally movable along said brake handlever, a stop piece adapted to be screwed along the outer end of said latch rod and to abut against the outer end of said brake handlever for securing said latch in its operative position, an actuating knob guided upon said outer end of the brake handlever and disconnectible means for connecting said knob to said stop piece and whereby the latter is adapted to be rotated by the former upon said latch rod.

4. In combination with a brake handlever, a locking quadrant, a latch adapted to cooperate with said quadrant, a spring controlled latch rod longitudinally movable along said brake handlever, a stop piece adapted to be screwed along the outer end of said latch rod and to abut against the outer end of said brake handlever for securing said latch in its operative position, an actuating knob guided upon said outer end of the brake handlever and disconnectible means adapted to be controlled by longitudinal displacement of said knob for connecting said knob to said stop piece and whereby the latter is adapted to be rotated by the former upon said latch rod.

5. In combination with a brake handlever, a locking quadrant, a latch adapted to cooperate with said quadrant, a spring controlled latch rod longitudinally movable along said brake handlever, a stop piece adapted to be screwed along the outer end of said latch rod and to abut against the outer end of said brake handlever for securing said latch in its operative position, an actuating knob guided upon said outer end of the brake handlever, peripheral grooves provided in said stop piece and springs secured to said knob and normally engaging said grooves for operatively connecting said stop piece to said knob and adapted to release said stop piece upon longitudinal displacement of said knob.

In testimony whereof I have signed my name to this specification.

ANDRE SAGET.